大专栏  US009235734B2

(12) United States Patent  
Greene (10) Patent No.: US 9,235,734 B2  
(45) Date of Patent: *Jan. 12, 2016

(54) SYSTEM AND METHOD FOR IDENTIFYING A GENUINE PRINTED DOCUMENT

(71) Applicant: Morton Greene, Potomac Falls, VA (US)

(72) Inventor: Morton Greene, Potomac Falls, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/254,275

(22) Filed: Apr. 16, 2014

(65) Prior Publication Data

US 2014/0306800 A1    Oct. 16, 2014

Related U.S. Application Data

(63) Continuation of application No. 13/324,663, filed on Dec. 13, 2011, now Pat. No. 8,742,891, and a continuation-in-part of application No. 12/816,601, filed on Jun. 16, 2010, now abandoned, which is a continuation-in-part of application No. 12/653,460, filed on Dec. 15, 2009, now abandoned, which is a continuation of application No. 12/462,126, filed on Jul. 29, 2009, now Pat. No. 8,134,734, which is a continuation of application No. 12/381,520, filed on Mar. 12, 2009, now abandoned, which is a continuation of application No. 12/356,903, filed on Jan. 21, 2009, now abandoned, which is a continuation of application No. 12/218,598, filed on Jul. 16, 2008, now abandoned.

(60) Provisional application No. 61/422,359, filed on Dec. 13, 2010.

(51) Int. Cl.
*G06K 7/00* (2006.01)
*G06K 9/00* (2006.01)
*H04N 1/32* (2006.01)
*G06K 1/00* (2006.01)
*G06K 7/10* (2006.01)
*G06K 7/14* (2006.01)
*H04N 1/00* (2006.01)

(52) U.S. Cl.
CPC ............... *G06K 7/0004* (2013.01); *G06K 1/00* (2013.01); *G06K 7/10297* (2013.01); *G06K 7/1404* (2013.01); *G06K 9/00577* (2013.01); *H04N 1/32133* (2013.01); *H04N 1/32144* (2013.01); *H04N 1/00326* (2013.01); *H04N 2201/0081* (2013.01); *H04N 2201/327* (2013.01); *H04N 2201/3235* (2013.01); *H04N 2201/3236* (2013.01); *H04N 2201/3239* (2013.01)

(58) Field of Classification Search
CPC ................................. G07B 5/04; G07C 15/005
USPC ......... 340/5.8, 5.84, 5.86, 10.2, 572.1, 572.4, 340/572.8; 235/375, 440, 441, 445, 492
See application file for complete search history.

(56) References Cited

U.S. PATENT DOCUMENTS 5,475,205 A * 12/1995 Behm et al. .................. 235/375
2006/0179481 A1* 8/2006 D'Agnolo ...................... 726/20

* cited by examiner

*Primary Examiner* — Tai T Nguyen
(74) *Attorney, Agent, or Firm* — Barnes & Thornburg LLP; Thomas J. McWilliams; Edward F. Behm, Jr.

(57) ABSTRACT

A system and method for verifying that a document is included in a document management system is disclosed. This system and method includes scanning of a scan track of a document, generating document data dependently upon the scanning, comparing the generated document data to stored document data, the stored document data generated dependently upon a prior scanning of the scan track of the document, and outputting an indication of the document being included in the document management system as determined by the comparing.

1 Claim, 9 Drawing Sheets

SYSTEM AND METHOD FOR IDENTIFYING A GENUINE PRINTED DOCUMENT

CROSS REFERENCE TO RELATED APPLICATIONS

This application is a continuation of U.S. patent application Ser. No. 13/324,663, filed Dec. 13, 2011, now U.S. Pat. No. 8,742,891, which claims priority of U.S. Provisional Application Ser. No. 61/422,359, filed Dec. 13, 2010, which is a continuation-in-part of U.S. patent application Ser. No. 12/816,601, filed on Jun. 16, 2010, now abandoned, which is a continuation-in-part of U.S. patent application Ser. No. 12/653,460, filed on Dec. 15, 2009, now abandoned, which is a continuation of U.S. patent application Ser. No. 12/462,126, filed on Jul. 29, 2009, now U.S. Pat. No. 8,134,734, which is a continuation of U.S. patent application Ser. No. 12/381,520, filed on Mar. 12, 2009, now abandoned, which application is a continuation of U.S. patent application Ser. No. 12/356,903, filed on Jan. 21, 2009, now abandoned, which application is a continuation of U.S. patent application Ser. No. 12/218,598, filed on Jul. 16, 2008, now abandoned, all of said applications are incorporated by reference herein as if set forth in their entirety.

FIELD OF THE INVENTION

This invention relates to the field of document management and more particularly, to a system and method for identifying a genuine printed document.

BACKGROUND OF THE INVENTION

Certain written or printed documents (hereinafter referred to as "documents") are important and/or valuable. It may be desirable in certain circumstances to independently confirm that such a document is genuine, and not fraudulent. It may also be desirable in certain circumstances to confirm that such a document has not been altered in an unauthorized manner.

Embodiments of the invention provide for document authentication that confirms that a document is genuine. Embodiments of the invention provide for document authentication that confirms that a written or printed document is genuine, and has not been altered in an unauthorized manner. Embodiments of the invention provide for document authentication that not only confirms that a written or printed document is genuine, and has not be altered in an unauthorized manner, but also mitigates the risk of losing the document, such as by fire or theft.

SUMMARY OF THE INVENTION

A method for verifying that a document is included in a document management system is disclosed. This method includes providing a document including a scan track of radio frequency readable information, radio frequency scanning the scan track with a scanner head no greater than 10 cm in width, generating document data dependently upon the radio frequency scanning, comparing the generated document data to stored document data, the stored document data generated dependently upon a prior radio frequency scanning of the scan track, and outputting an indication of the document being included in the document management system as determined by the comparing.

A method for verifying that a document is included in a document management system is disclosed. This method includes providing a document including a scan track having scanner readable information, optically scanning the scan track with a scanner head no greater than 10 cm in width, generating document data dependently upon the optical scanning, comparing the generated document data to stored document data, the stored document data generated dependently upon a prior optical scan of the scan track, authenticating the document data using at least one radio frequency scan, outputting an indication of the document being included in the document management system as determined by the comparing and the authenticating, and the authenticating storing any variations in the generated document data as updated stored document data.

A system for verifying that a document is included in a document management system is disclosed. The system includes a radio frequency document scanner including a scanner head no greater than 10 cm in width, a memory storing document verification data associated with the document, a computing system operatively connected to the radio frequency scanner and the memory, and computing system executable code accessible by the computing system and operative by the computing system to: receive data indicative of a radio frequency scan from the radio frequency document scanner of a scan track of the document having radio frequency readable information, generate document data dependently upon the received radio frequency, access the memory to recover the document verification data, compare the generated document data to the recovered document verification data, the document verification data being previously generated dependently upon a prior radio frequency scanning of the portion of the document, and provide an output indicative of the document being included in the document management system if the generated document data is substantially identical to the recovered document verification data as determined by the compare.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts.

DETAILED DESCRIPTION OF THE PREFERRED EMBODIMENTS

It is to be understood that the figures and descriptions of the present invention have been simplified to illustrate elements that are relevant for a clear understanding of the present invention, while eliminating, for the purpose of clarity, many other elements found in typical document processing systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Figure 1:
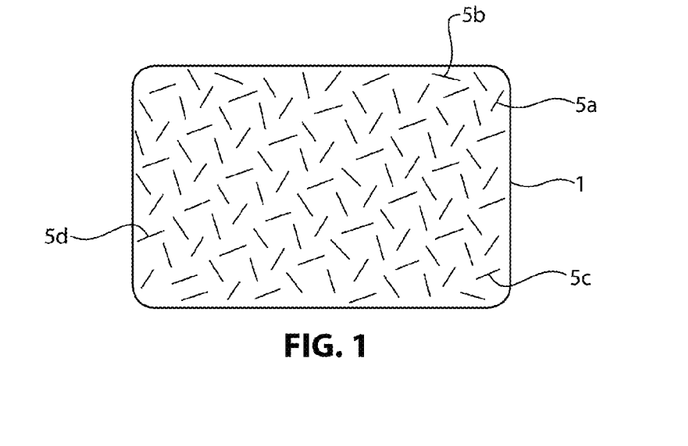
FIG. 1 illustrates a plan view of a substrate according to an embodiment of the present invention.

Referring now to FIG. 1, there is shown a plan view of a substrate 1 according to an embodiment of the present invention. Substrate 1 may be suitable for being written or printed on using conventional marking technology, such as ink or toner. Substrate 1 may be akin to a conventional sheet of paper. In the illustrated embodiment, substrate 1 incorporates a plurality of passive resonators 5a, 5b, . . . , 5n. In the illustrated embodiment, resonators 5a-n are randomly disposed. In the illustrated embodiment, resonators 5a-n are depicted as line segments each indicative of a thin dipole antenna or dipole, such as an elongated metal or metalized article. Such a dipole is resonant at an interrogating frequency related to the length of the dipole, for example, at which the dipole is ½ wavelength in length. A wide variety of lengths may be used depending on the desired resonant frequency and the nature of the reader. In an embodiment, resonant articles 5a-n may be formed of thin dipoles having a thickness from about 100 angstroms to 2 millimeters, and a length of about 0.5 millimeters. The density of diploes 5a-n may be on the order of about 2 to 5 dipoles per square cm of surface area. Metalized glass fibers may also be used as the thin dipoles; such fibers may be on the order of 0.001 inches in diameter. Substrate 1 may be manufactured in any suitable manner, including that discussed in U.S. Pat. No. 6,471,878 issued to the inventor hereof, and entitled METHOD FOR FORMING A RADIO FREQUENCY RESPONSIVE TARGET AND APPARATUS FOR VERIFYING THE AUTHENTICITY OF THE SAME, the entire disclosure of which patent is hereby incorporated by reference as if set forth in its entirety herein.

Figure 2:
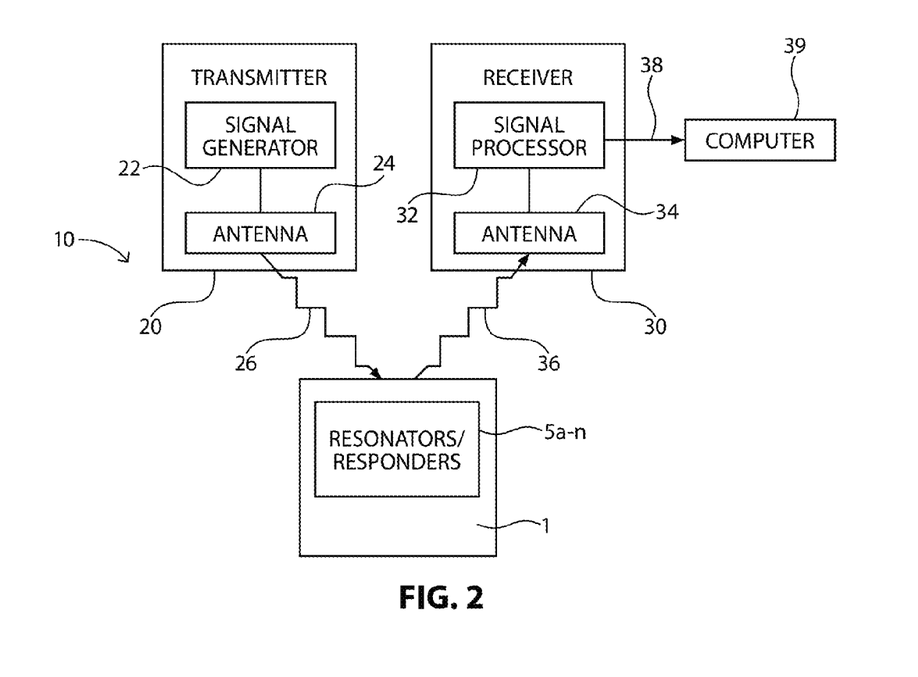
FIG. 2 illustrates a block-diagram view of a system according to an embodiment of the present invention.

Referring now also to FIG. 2, there is shown a block-diagram view of a system 10 according to an embodiment of the present invention. In the illustrated embodiment, resonators 5a-n may be responsive to radio frequency (RF) transmitter 20 that impinges them with an interrogating RF signal 26. An RF receiver 30 may detect the resonators' 5a-n response 36 to interrogating signal 26. In the illustrated embodiment, transmitter 20 includes a signal generator 22 coupled to an antenna 24 for generating radio frequency interrogating signals 26 in a desired target field. Receiver 30 may receive radio frequency response signals 36 at antenna 34 coupled to signal processor 32. Signal processor 32 may produce an output 38 indicative of the resonators 5a-n, and hence the substrate 1, within the target field in response to signals 36 received by antenna 34. In the illustrated embodiment, output 38 may be supplied to an information processing system 39. In certain embodiments of the present invention, transmitter 20 and receiver 30 may be physically associated in a single transceiver unit, and the functions of antennas 24 and 34 may be performed by a single antenna. System 10 may be designed to detect radio frequency responses in the near field of the antenna(e), in the far field of the antenna(e), or both.

In the illustrated embodiment, information processing system 39 may include a computing device, such as, for example, a computer. "Computer", as referred to herein, refers to a general purpose computing device that includes a processor. "Processor", as used herein, refers generally to a device including a Central Processing Unit (CPU), such as a microprocessor: A CPU generally includes an arithmetic logic unit (ALU), which performs arithmetic and logical operations, and a control unit, which extracts instructions (e.g., code) from memory and decodes and executes them, calling on the ALU when necessary. "Memory", as used herein, refers to one or more devices capable of storing data, such as in the form of chips, tapes, disks or drives. Memory may take the form of one or more random-access memory (RAM), read-only memory (ROM), programmable read-only memory (PROM), erasable programmable read-only memory (EPROM), or electrically erasable programmable read-only memory (EEPROM) chips, by way of further non-limiting example only. Memory may be internal or external to an integrated unit including a processor. Memory may be internal or external to the computer. Such memory may typically store a computer program, such as, for example, code or sequence of instructions being operable by the processor.

It should be appreciated that when a substrate not incorporating resonators 5a-n is interrogated with system 10, output 38 will not be indicative of any particular substrate. However, when a substrate 1 incorporating responders 5a-n is interrogated with system 10, output 38 will be indicative of the existence and positioning of responders 5a-n, and hence substrate 1.

Figure 3:
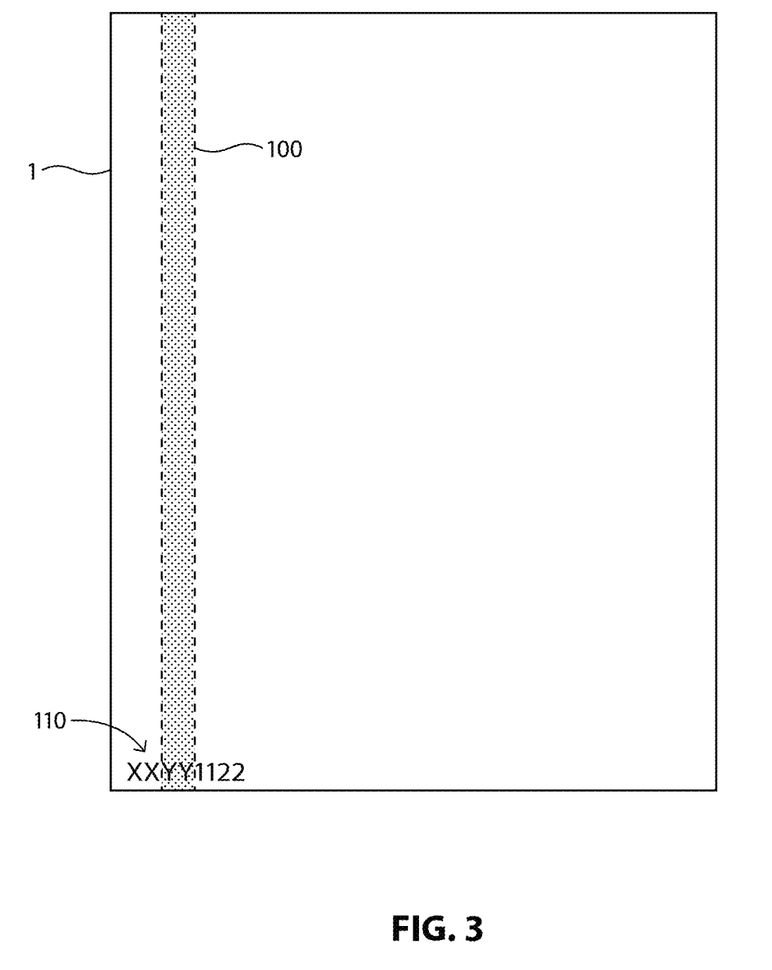
FIG. 3 illustrates a plan view of a substrate and scan track according to an embodiment of the present invention.

More particularly, transmitter 20 and receiver 30 may be positioned to interrogate a predetermined portion of substrate 1. Referring now also to FIG. 3, there is shown a plan view of substrate 1 according to an embodiment of the present invention. Also shown in FIG. 3 is a scan track 100. According to an embodiment of the present invention, transmitter 20 and receiver 30 may be positioned to interrogate scan track 100 of substrate 1 in a temporal fashion, for example, transmitter 20 and receiver 30 may temporally scan along, by being laterally displaced along, track 100. For example, substrate 1 may be laterally displaced over time relative to transmitter 20 and receiver 30, or transmitter 20 and receiver 30 may be laterally displaced over time relative to substrate 1.

Figure 4:
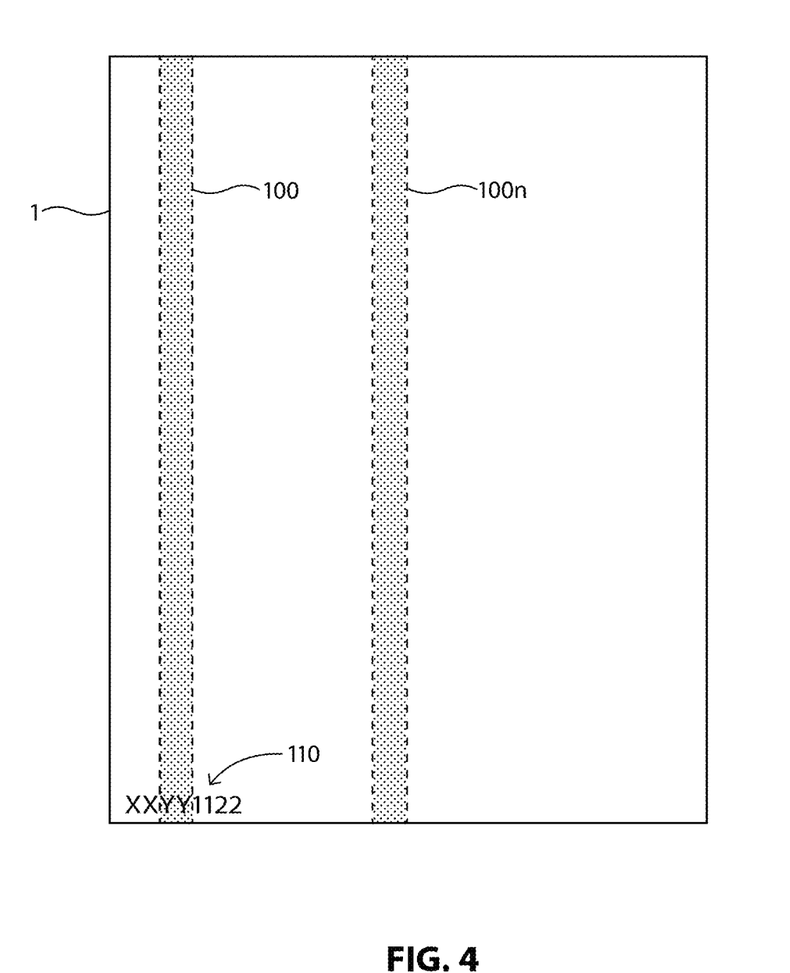
FIG. 4 illustrates a plan view of a substrate and multiple scan tracks according to an embodiment of the present invention.

Referring now also to FIG. 4, there is shown a plan view of another substrate 1 according to an embodiment of the present invention. Also shown in FIG. 4 are scan tracks 100a-100n (two such scan tracks 100a and 100b are shown in the illustrated embodiment). According to an embodiment of the present invention, transmitter 20 and receiver 30 may be positioned to interrogate scan tracks 100a-100n of substrate 1 in a temporal fashion, either in serial or parallel. Certain embodiments of the present invention may use multiple scan tracks for improved identification performance. Again, substrate 1 may be laterally displaced over time relative to transmitter 20 and receiver 30, or transmitter 20 and receiver 30 may be laterally displaced over time relative to substrate 1.

Figures 10, 11, 12:
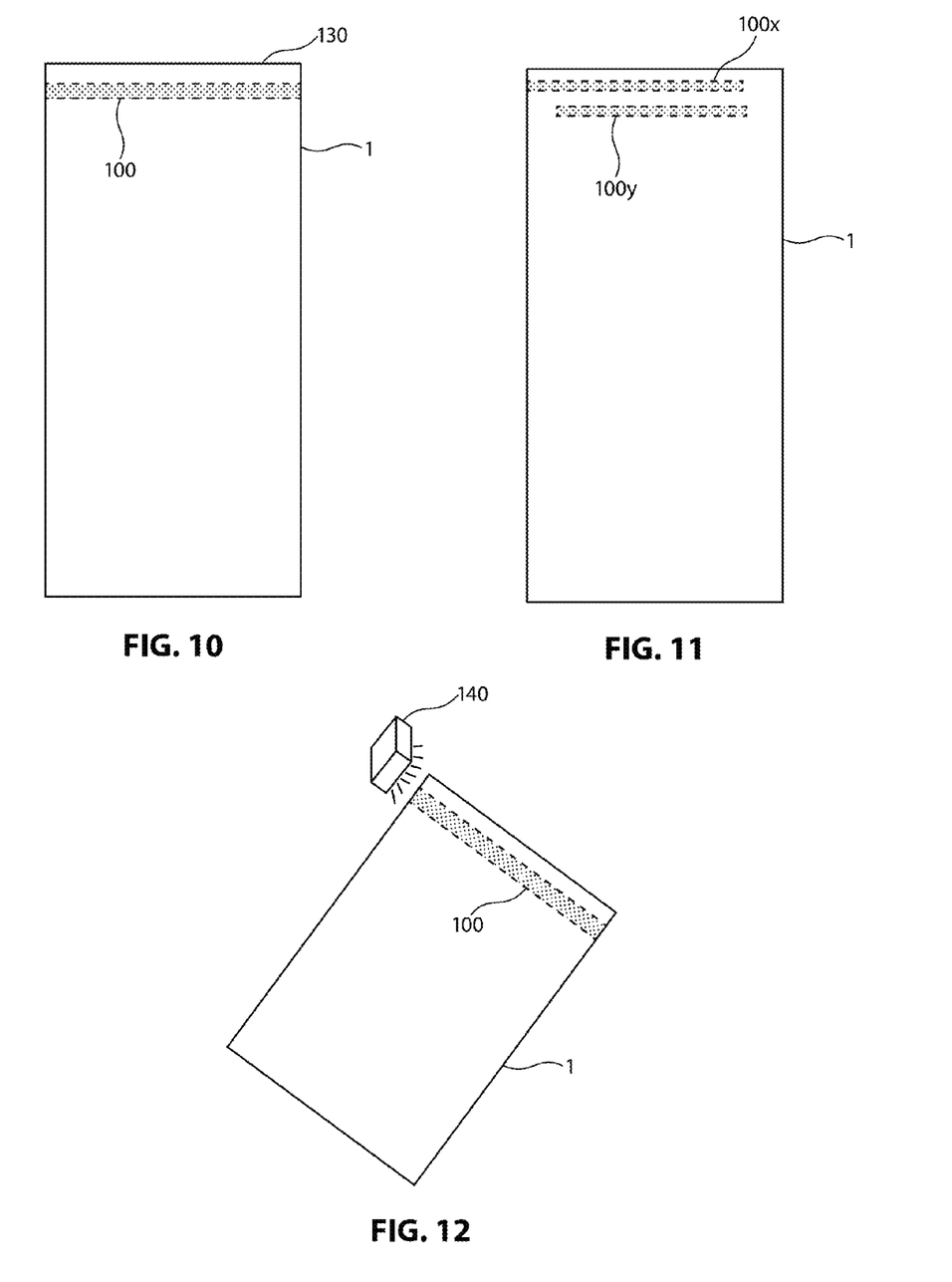
FIG. 10 illustrates a plan view of an enrolled document according to an embodiment of the present invention.
FIG. 11 illustrates a plan view of an enrolled document according to an embodiment of the present invention.
FIG. 12 illustrates a scanner head according to an embodiment of the present invention.

As shown in FIG. 10, scan track 100 may be positioned along shortest side 130 of substrate 1 (i.e., the side of substrate 1 having the shortest dimension). Scan track 100 may be coextensive with shortest side 130, or may cover only a portion of shortest side 130. As illustrated, scan track 100 measures no greater than about three inches from shortest side 130, and may measure no greater than about one inch from shortest side 130. As illustrated, scan track 100 measures no greater than about one inch in width, and may measure about one half inch in width.

As shown in FIG. 11, scan track 100 may be positioned such that it extends to only one edge of substrate 1 (scan track 100x), or such that scan track 100 does not extend to any edges of substrate 1 (scan track 100y). As illustrated, scan track 100 measures no greater than about three inches from shortest side 130, and may measure no greater than about one inch from shortest side 130. As illustrated, scan track 100 measures no greater than about one inch in width, and may measure about one half inch in width.

With the scan tracks 100 as shown in FIGS. 10 and 11, a user does not have to scan the whole document in order to verify that the document is authentic. Instead, the user only needs to scan the portion containing the scan track 100. This approach saves the user significant time, especially where many documents need to be scanned to verified their authenticity.

Referring still to FIGS. 3 and 4, substrates 1 identified therein also include a printed reference identifier 110. In certain embodiments of the present invention, such an identifier may be uniquely associated with the particular substrate it is printed upon. In certain embodiments of the invention, such an identifier may be associated with a finite group of substrates, such as those in a particular package or provided to a particular user, for example.

Figure 5:
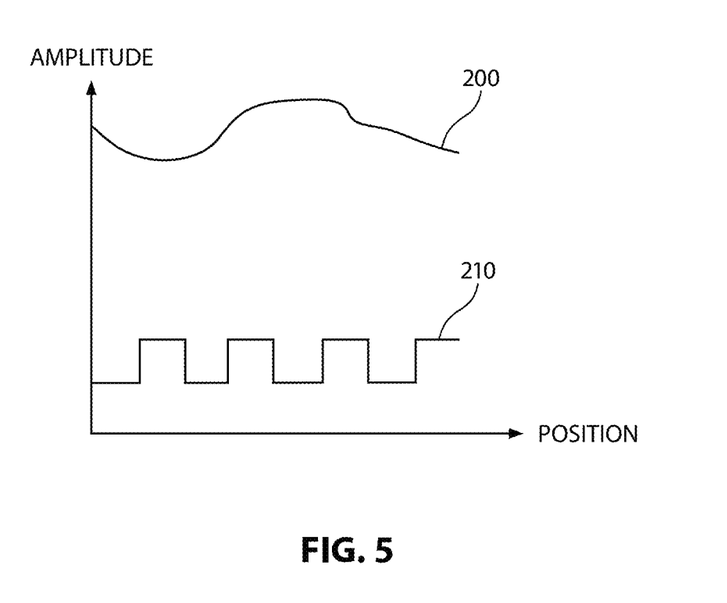
FIG. 5 illustrates a diagram of an RF signature of resonators positioned within a scan track in accordance with an embodiment of the present invention.

Referring now also to FIG. 5, there is shown a diagram illustrating an RF signature 200 that may be sensed by receiver 30 by illuminating resonators positioned within scan track 100 or 100a-n with an interrogating RF signal using the transmitter 20, in accordance with an embodiment of the present invention. The horizontal axis of FIG. 5 corresponds to the position along a scan track 100, 100a-n being read, and the vertical axis is the received signal amplitude. Waveform 200 illustrates a received signal amplitude, while waveform 210 illustrates a clocking signal 210, which may be stored in a magnetic stripe or stored as optical markings upon a substrate for correlating the position of the substrate with the received RF signal. Alternatively, clocking signal 210 may be provided by or to receiver 30 independently of substrate 1, and correlated with the lateral transposition of transmitter 20 and receiver 30 relative to substrate 1. For example, clocking signal 210 may be correlated with movement of substrate 1 past transmitter 20 and receiver 30, such as by using a stepper motor to move substrate 1, or a sensor to detect the relative movement there-between. Conventional approaches utilized with digital document scanners may be used, for example.

When dipoles are randomly distributed along scan track 100, 100a-n, the response created thereby may result in an RF amplitude versus position waveform, as illustrated by waveform 200 of FIG. 5. The amplitude versus position characteristics of this waveform may be used to uniquely, or at least substantially uniquely, identify or serialize scanned substrate 1. For example, RF waveform 200 may be converted to a digital code word. RF waveform 200 may be digitized (or sampled) to form a digitized RF response signal, and the digitized RF response signal may be normalized to produce a normalized digitized RF response signal, which may then be converted to a code word. The digitized RF response signal may be converted to a code word using the methodology discussed in the above-incorporated U.S. Pat. No. 6,471,878, for example. Such a code word may be considered to be at least substantially uniquely associated with the particular substrate 1 scanned to generate/recover it.

According to an embodiment of the present invention, one or more tables or databases may be stored so as to be accessible by computer 39 (FIG. 2). For example, such a database may be stored in memory either local (e.g., internal or external) or remote to computer 39. Such a database may store codewords and information associated with the codewords. In certain embodiments of the invention, the codewords may be used as an address or an index to a lookup table which stores information associated with the corresponding codeword. In certain embodiments of the invention, the reference identifiers may be used as an address or an index to a lookup table which stores information associated with the corresponding reference identifier. In certain embodiments of the invention, a separate index value may be used as an address or an index to a lookup table which stores information associated with the corresponding index value. Associated information may be stored in such a database so as to be correlated with the codeword, reference identifier and/or index value. For example, for each entry, associated data may include: document owner information (e.g., name, address, phone number, social security number, and driver license number), document creation or registration date information, document revision date information, document descriptor information and/or other information relevant to the document.

When a document is initially scanned and a code word identified, a user may be prompted to enter the information to be associated with the code word in the table(s)/database(s), such as by using computer 39 (FIG. 2). Accordingly, such a database, or one or more tables, may be populated with codewords and the associated information, such as by using computer 39. Documents so scanned may be considered to be enrolled in the database for later authentication.

Figure 6:
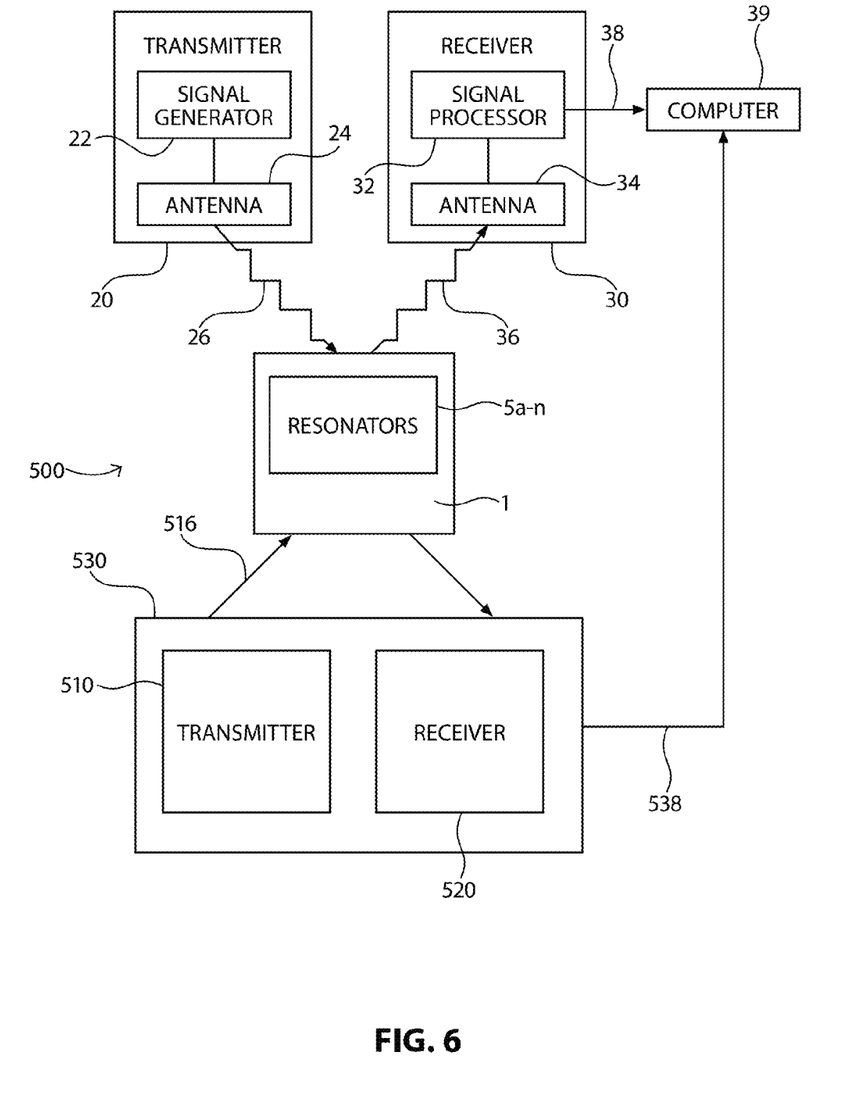
FIG. 6 illustrates a block diagram view of a system according to an embodiment of the present invention.

Referring now also to FIG. 6, there is shown a block diagram representation of a system 500 according to an embodiment of the present invention. System 500 additionally includes an optical energy transmitter 510 and optical energy receiver 520. In the illustrated embodiment, transmitter 510 may impinge substrate 1 with optical energy, while receiver 520 receives optical signals indicative of the markings of substrate 1. In certain embodiments of the present invention, transmitter 510 and receiver 520 may be incorporated in a conventional optical document scanner apparatus 530. Apparatus 530 may be akin to those used in digital document copiers and/or scanners, for example. Apparatus 530 may provide as output 538 data indicative of an optical scan of substrate 1.

For purposes of completeness, scanner 530 may generally take the form of a device that may detect markings, such as, for example, text or illustrations, printed on a substrate, paper, and translate the information into a form that a computer, such as computer 39, may use. Such a scanner may typically digitize the markings, dividing the markings into a grid of boxes and representing each box with a data value, depending on whether the box is marked. The resulting matrix of bits may be used to form a bit map that may be stored. Scanner 530 may not distinguish text from illustrations; as both types of markings may be represented as bit maps. Scanner 530 may utilize a charge-coupled device (CCD) array that includes a plurality of light receptors that detect variations in light intensity and frequency. Other conventional approaches, such as a photomultiplier tube (PMT) based scanner may alternatively be utilized. Scanner 530 may utilize any suitable resolution, such as up to or greater than 600 dots per inch (DPI), for example. Scanner 530 may be monochrome or color capable. Scanner 530 may use any suitable bit depth. Scanner 530 may be hand-held, page fed or page based. Where clocking signal 210 (FIG. 5) is independent of substrate 1, movement of the page or scanner relative to the other may be correlated with the clocking signal. In certain embodiments of the present invention, conventional optical character recognition (OCR) technology may be used, such as by computer 39, to translate at least a portion of the bit map into ASCII characters, for example. Such ASCII characters may be stored and associated with the scanned document for example. In certain embodiments of the present invention, reference ID 110 (FIGS. 3 and 4) may be converted into ASCII characters, for example. Alternatively, more or less of a scanned bit map may be converted to ASCII characters via conventional OCR techniques.

Traditional scanning generally requires the scanning of an entire document to obtain desired information. Whole document scanning can be a time consuming endeavor, especially where multiple documents and/or documents with multiple pages need to be scanned. Whole document scanning is superfluous and wastes time in cases where only a portion of the document (i.e., the scan tracks) needs to be scanned (in contrast to the whole document) in order to achieve a desired result. The desired result, in the present invention, is to verify the authenticity of the document. One approach to this problem is described above, where only a portion of the document needs to be scanned. Another approach is illustrated in FIG. 12, which illustrates using a scanner head 140 that is no greater than about 10 cm in its longest dimension. The smaller scanner head 140 allows the scanning to be completed more efficiently and more expeditiously where only portions of a document need to be scanned.

Scanner head 140 can be integral with a scanner. Alternatively, scanner head 140 can be coupled with a scanner via a wire connection or via a wireless connection. In a wireless configuration, scanner head 140 can be powered by batteries inserted into scanner head 140, powered by rechargeable batteries integral with scanner head 140, or the like.

While scanner head 140 is illustrated as a rectangle, scanner head 140 can be a square, a pentagon, a heptagon, an octagon, or any other polygonal shape. Scanner head 140 can be a circle, an oval, or other similar shape. Scanner head 140 can also be a non-geometrical shape.

Preferably, scanner head 140 is no greater than about 10 cm in its largest dimension, more preferably no greater than about 7 cm in its largest dimension, and most preferably no greater than 3 cm in its largest dimension. The largest dimension of the device is for example, the diameter if scanner head 140 is a circle and diagonal length if scanner head 140 is a square.

For example, a 4¼" RF scanner head 140 may be placed within scanner at a height of, for example 2-5 mm, and more preferably approximately 3 mm, above a document to be scanned. Thereby, a 1" band may be illuminated, such as along the center of the scanned document. Thus, a signature for the scanned document may be obtained with less dependence on mechanical alignment of scanner head 140, and with decreased dependence on the orientation of the scanned document.

Referring now to Table-I, there is shown a table used to correlate data indicative of output signal 38 and 538, according to an embodiment of the present invention.

| Codeword (Signal 38) | Reference ID (Signal 538) | Doc. Info. 1 | ... | DATA FILE |
|---|---|---|---|---|
| 0010 ... 0001 | XXYY1122 | Owner 1 Name | ... | xxxyyy122.dat |

The illustrated Table-I includes a single entry that may be generated by, or responsively to, computer 39. The entry indicates a codeword of "0010 ... 0001" corresponds to a scanned document having a marked reference identifier "XXYY1122". Information associated with the scanned document may is also be stored, consistently with the above-discussion. Table-1 may also include a data file identifier. The substrate used to generate the exemplary entry may be considered to be enrolled for later authentication.

In certain embodiments of the present invention, each identified data file includes data indicative of the markings on the corresponding document, such as the bitmap represented by output 538, for example. In certain embodiments of the present invention, the data file may include data generated by manipulating either the codeword using the markings indicative data or the markings indicative data using the codeword. In certain embodiments of the present invention, the data file may be protected, such as via conventional encryption techniques. In certain embodiments of the present invention, the markings indicative of data (for example, output 538 provided bit map data) may be encrypted using the codeword as an encryption key.

Figure 7:
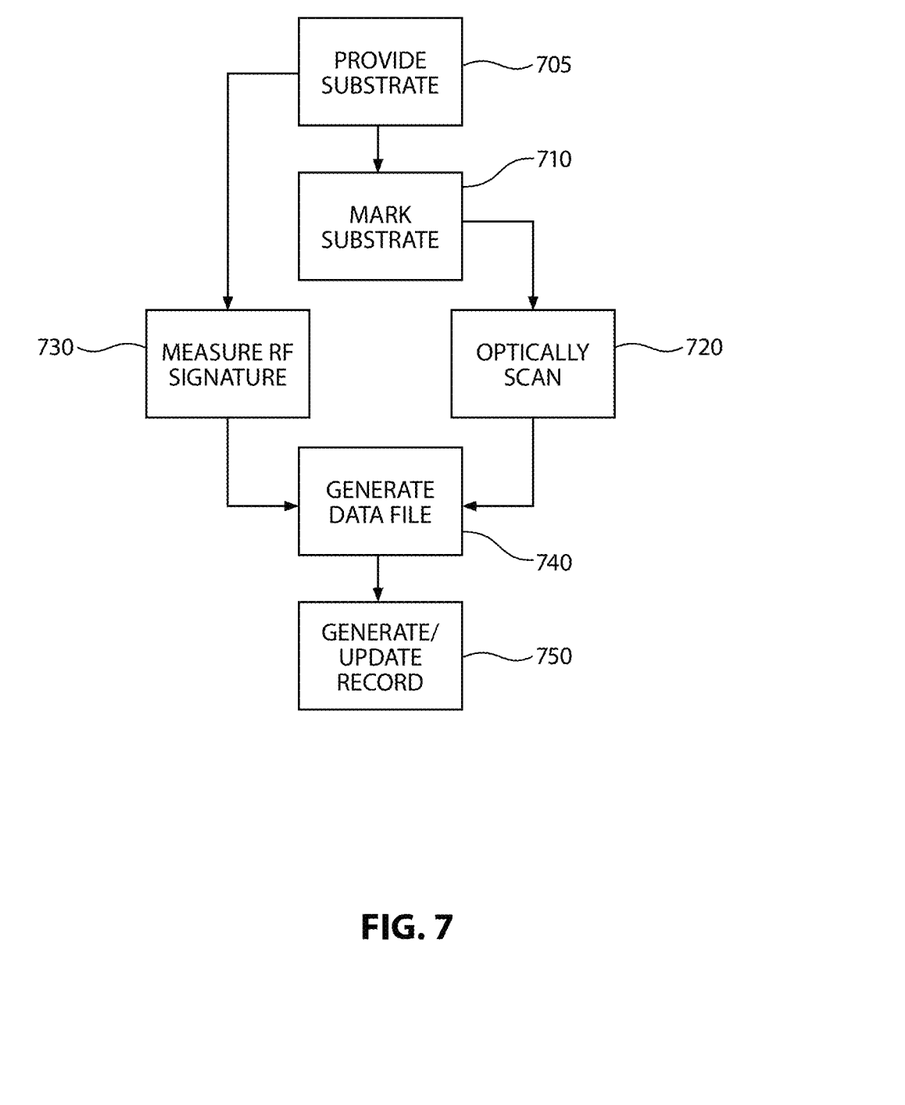
FIG. 7 illustrates a block diagram of a process for enrolling a document to be authenticated according to an embodiment of the present invention.

Referring now to FIG. 7, there is shown a block diagram of a process 700 for enrolling a document according to an embodiment of the present invention. In the illustrated embodiment, process 700 begins with providing a substrate at block 705, such as substrate 1 (FIG. 1), for example. Block 705 may include providing one or more substrates, such as, in the form of individual sheets or a pack of paper, for example. At block 710, the substrate may be marked in a conventional manner. Marking at block 710 may include handmarking, copying, ink jet and/or laser printing onto a provided substrate using a conventional document copier or printer, for example. At block 720, the document may be optically scanned, by using scanner 530 (FIG. 6), for example, to provide image data, such as a bit map indicative output 538 (FIG. 6). At block 730, at least a portion of the marked document, such as, one or more scan tracks 100, 100a-n, may be RF scanned using transmitter/receiver 20, 30 (FIG. 6), to provide an RF signature codeword by computer 39 responsively to output 38. At block 740, the RF signature codeword (block 730) and provided image data (block 720) may be used to generate a data file, such as by encrypting the image data using the codeword, for example. At block 750, a record (for example, akin to the record shown in Table-I) may be generated by or using computer 39. The record may associate information, including the generated data file (block 740) with the optically and RF scanned document.

Figure 8:
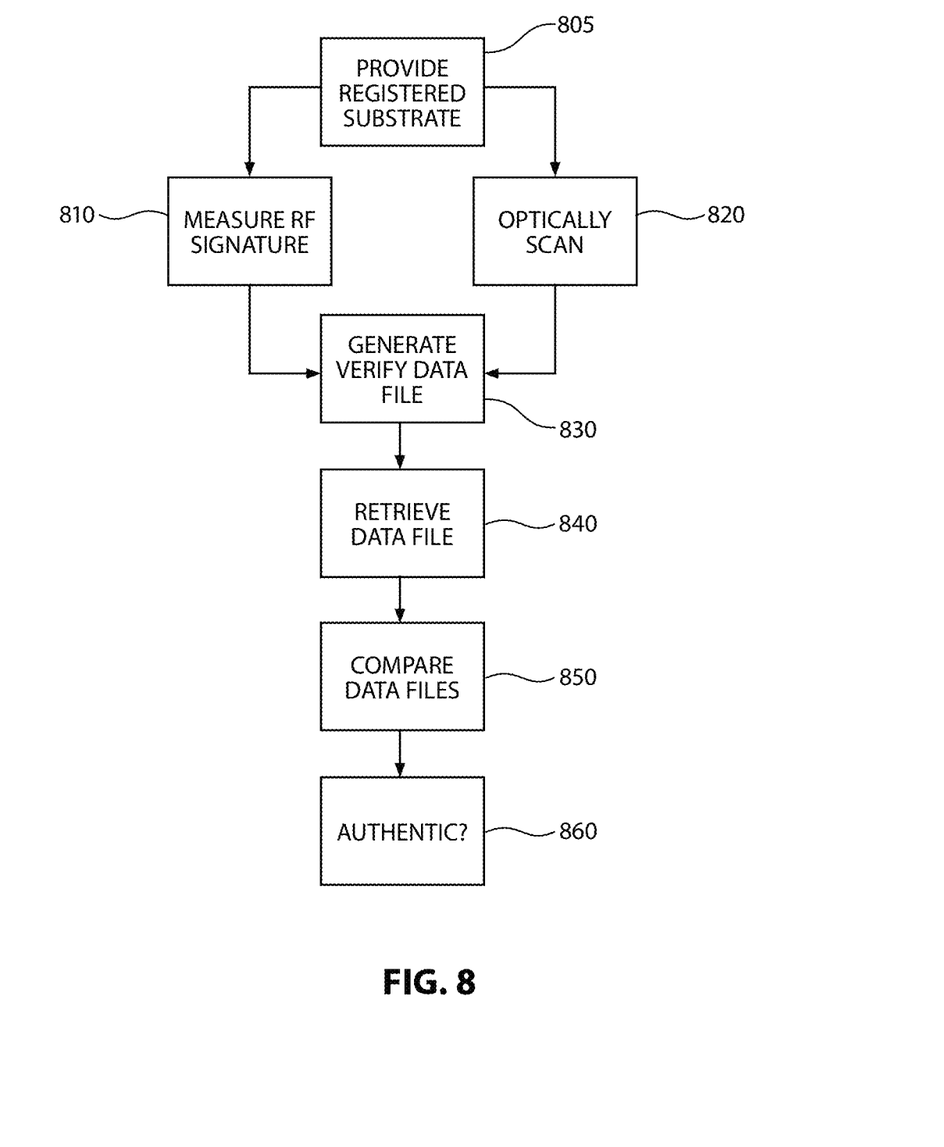
FIG. 8 illustrates a block diagram of a process for authenticating an enrolled document according to an embodiment of the present invention.

Referring now to FIG. 8, there is shown a block diagram of a process 800 for authenticating an enrolled document according to an embodiment of the present invention. In the illustrated embodiment, process 800 may begin with providing a registered document (e.g., FIG. 7), at block 805. At block 810, the RF signature may be measured (analogously to block 730, FIG. 7). At block 820, the document may be optically scanned (analogously to block 720, FIG. 7). At block 830, a verification data file may be generated (analogously to file generation at block 740, FIG. 7). At block 840, the record and data file for the scanned document (generated at block 750, FIG. 7) may be retrieved. At block 850 the file generated at block 830 may be compared to the file generated at block 840. At block 860, if the files are determined to sufficiently match, the document provided at block 805 may be authenticated. At block 860, if the files are determined to sufficiently differ, the document may not be authenticated.

By way of non-limiting example, file retrieval at block 840 may be achieved using any conventional manner. For example, where the table/database containing the record is indexed by codeword, the codeword generated at block 810 may be used to recover the file. Where the table/database containing the record is indexed by reference identifier (e.g., 110, FIGS. 3, 4), bit map data generated at block 820 may be subjected to a conventional OCR technique to determine the reference ID and recover the corresponding file. Where the table/database is otherwise indexed, appropriate queries may be carried out (for example, by or at the request of computer 39) to determine the file to be recovered. Alternatively, a user may be requested to enter one or more items of information (akin to the associated information and/or reference identifier) using computer 39, which information may then be used to determine the file to be recovered.

In certain embodiments of the present invention, documents may be updated by re-enrolling or updating their enrollment. In such a case, the prior generated record may be appended or replaced, for example. In such embodiments, restrictive access/authorization techniques may be used to restrict enrollment updating. For example, when a document is enrolled, a password required to re-enroll or update the document enrollment may be associated with the record.

It should be appreciated that stored data files represent optical images of scanned documents. The table(s)/database(s) and associated data files may be stored in memory for later retrieval for any desired amount of time. Accordingly, a copy of a scanned document may be recovered at any point during this time, even if the original is lost or destroyed, by performing suitable queries of the stored table(s)/database(s), using computer 39 for example.

Figure 9:
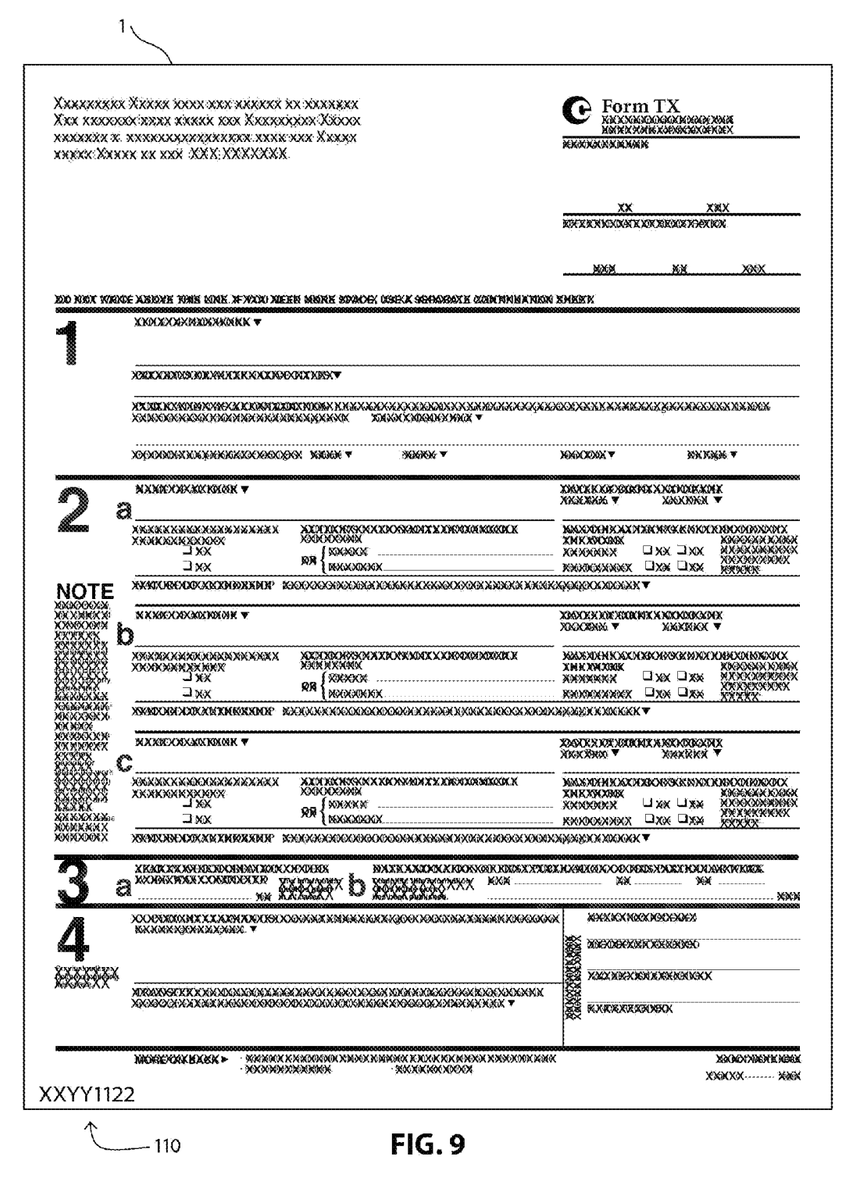
FIG. 9 illustrates a plan view of an enrolled document according to an embodiment of the present invention.

In certain embodiments of the present invention, substrate 1 may be preprinted with information, e.g., so as to serve a fill-able form, prior to being provided to a user. Referring now to FIG. 9, there is shown a substrate 1 according to such an embodiment of the present invention. In the illustrated embodiment, substrate 1 has been pre-printed as the first page of a United States Copyright Office Form TX, which is an application to register a non-dramatic literary work. Of course, it should be understood that substrate 1 may be pre-printed with any type of information, and may take the form of any form, for example. Referring still to FIG. 9, as may be readily ascertained, Form TX has a plurality of spaces to be filled in by the user. According to an embodiment of the present invention, such a Form TX printed on a substrate 1 may be enrolled and then provided to and filled out by a user. Such a form may then be authenticated, such as in accordance with the processes discussed above. Thereafter, the authenticity of substrate 1, and hence Form TX may be updated and/or confirmed by a third party. Further, should the form be lost, a copy may be recovered as discussed above.

A desktop portable scanner may be utilized according to an aspect of the present invention. According to this aspect of the invention, a bootable compact disc or other storage and readable medium may contain software according to the current invention. In such a configuration, a radio frequency fingerprint may be included on the paper as discussed hereinabove. A similar radio frequency fingerprint may also reside on the compact disc or other storage medium. Matching or linking of the two fingerprints, such as by computerized means, may allow the desktop scanner to operate according to the present invention.

According to an aspect of the present invention, the accuracy and/or ability to detect error in the present system may be related to the ability to detect the signal, that is, the signal strength. For example, an error of 1:200 million may result at 12 dB at a one foot distance. Such characteristics demonstrate that the signal level is the key to properly identifying the document. Of course, such distance may be consistently controlled through the use of the scanner of the present invention.

According to an aspect of the present invention, nanonumbers may be utilized to provide increased numbers of identifiable documents, and therefore more security in document mapping. As is known to those possessing an ordinary skill in the pertinent arts, nanonumbers may be defined as a random number raised to the power of another random number. By utilizing the serial code of the present invention, as discussed above, nanonumbers of unique RF codes may be provided, and thereby the security of the selection may be increased. In a particular embodiment of the present invention, a consumer may purchase foodstuffs having a nanonumber serial code associated with the foodstuff. The consumer may check an optical scan of the foodstuff against the nanonumber serial number, which may be an RF indicated nanonumber associated with an optically scannable bar code, for example, such as by sending the optical and RF scans to the database of the present invention to thereby allow the database to identify the nanonumber serial number and respond by confirming that the document is in the database, and/or matches the dictated optical scan. Alternatively, the database may respond by confirming that the serial number is counterfeit, such as, for example, by having the serial number not found in the database. Although such RF nanonumbering may be sufficient to determine if a document is, in fact, included in the database of documents, it may be unable to provide information regarding the veracity of the contents of the foodstuff. Thus, the optical scan of the document is relied upon to authenticate the content of the foodstuff.

Thus, according to an aspect of the present invention, a RF scan of a document may be performed. From the results of the RF scan, a comparison may be made to the database to determine if the RF signature is a valid signature as compared to the signatures stored in the database. In such a situation, the RF signature comparison may be sufficient to determine if a document is, in fact, included in the database of documents. An optical scan of the document may then or additionally be required in order to authenticate actual content.

According to an aspect of the present invention, the types of documentation that may be authenticated by the present invention may include, but are not limited to, testimony, documents that would otherwise be notarized, and documents that may be escrowed. Further, certified copies of documents of the present invention may be obtained from the system of the present invention. Such authenticated, certified copies may be requested from the system in order to replace missing or destroyed documents, for example. The system may therefore operate in a closed loop manner to identify, authenticate and/or recreate documents, and deliver those documents to the proper owner/holder as necessary.

According to an exemplary embodiment of the present invention, the document identifier of the present invention may be placed in the bottom left hand corner, such as not to extend beyond 1" from the bottom of the paper and no farther than 3" from the left edge, by way of non-limiting example. OCR A may be the font used. The document identifier may be formatted to take the form -YY-IN-A1A1A1. The first two characters (YY) may alphabetical and signify the year, starting from the year 2000. In such a configuration, two alphabetical characters may allow for 783 years, for example. A dash may be used as a separator. The next two characters (IN) may be a modified alpha numeric identifier that is indicative of the industry/section the document is associated with. In this configuration, there are combinations to allow for 1155 industry/sections. The final six characters (A1A1A1) may be separated by a dash, and may contain a modified alphanumeric. The final six characters may act as the unique identification, as described hereinabove. In such a configuration, there are approximately 1,544,804,000 possible unique identifications according to this exemplary aspect of the present invention.

The number and identification scheme described hereinabove may be subject to change. For example, the schema set forth may not use the following letters: O, S, Z, and I. Alternatively, for example, if more years are needed, the present system may be switched to employ a modified alphanumeric.

Similarly, RF scanning and/or authentication of documents may be included in shredders and other office equipment, such as copiers, for example. Use of the RF scanning on office equipment may incorporate many of the functions disclosed herein, including but not limited to prevention of unwanted copying and prevention of unwanted destruction. For example, in the case of a copy machine, an RF scan may be performed by the copy machine prior to allowing a user to select the copy button, for example. In such a configuration, the unique RF fingerprint may be examined and reviewed in the database, and if the document is registered as a not allowable to copy, or has some secretive nature, then the copy machine may not activate to copy the document, or may blank out the copy.

In the case of a shredder, for example, the shredder may be equipped with an RF scanner that scans the RF signature of the document prior to activation of the shredding function. In the event that a particular signature is detected, the machine may shutdown. Alternatively, the machine may query the database to determine if a destruction clause is associated with the document fingerprint, or a no destruction tag, or a one-of a kind registration in the database, and, in one or more such cases, shredding may be precluded.

An advanced system has been developed for event ticket reservation, purchase, and issuing designed to reduce overall event patron services cost. The Eventicate™ system takes advantage of proven, patented technologies. These patents are public, yet cannot be compromised even by us and our licensed suppliers. The most recent of a series of patents covering the technology for this system has been issued in 2010 and more are pending.

Eventicate™ makes use of resonant electronic nano particles (REN) embedded in customer's custom paper. These nano resonators are recognized electronically and create billions of natural random serial numbers in the paper stock. A unique serial number is derived from this REN paper and assigned to each ticket blank created, to be issued at a later date by the system. These REN serial numbers are naturally created, this prevents hackers from replicating the serial numbers stored in the Eventicate™ system since there is was no computer generated key to be hacked.

This system helps to mitigate: Stolen ticket stock for sale; Counterfeit Event Tickets; Control Blocking reservations by scalpers; Reduced staffing costs; Personalized photo keepsake function for printed tickets; Parking area and street scalpers selling fraudulent counterfeit tickets.

For major events the following features and functional steps are: 1) The Eventicate™ ticket material is produced in a secure manufacturing facility to the customers requirement. This material we call the "Base Stock"; 2) The base stock is then sent to a licensed, secure converter who prints the non variable images and graphics on the tickets. A visual random serial (VRS) number is printed on the face of this stock; 3) During converting and ticket printing process, each ticket produced is scanned and the nano resonator serial number for each blank ticket is placed into a database linking both the printed ticket number and the nano random ticket number; and 4) These tickets are then separated into ticket stack sets up to 10,000 blanks for ease of handling. These stacks are placed in a kiosk.

Tickets are not valid until they are redeemed by the purchaser. When the ticket is redeemed and printed, the, and transaction data is copied to an active database for that event, including the REN derived ticket serial number and the visual random serial number. The ticket information and the active database are both accessible when the ticket is redeemed, for example by a credit card user purchasing a ticket at a Kiosk, or cashier/ticket window.

After a ticket is issued to a purchaser such as an event attendee, the next step is for the attendee to present the ticket to a ticket reader at an admission point to the event venue, such as an open lane, turnstile, or closed lane with paddle or gate elements. The ticket reader scans the ticket to obtain the visual serial number printed thereon, and interrogates the ticket to obtain a confirmation REN-derived serial number. The ticket reader then accesses the database to compare the stored REN-derived serial number associated with the visual serial number with the confirmation REN-derived serial number just obtained. If the presented ticket visual and has been altered or modified and the disposition of the resonators thereon has changed, its REN-derived confirmation serial number will not match. If the ticket is a counterfeit, the confirmation serial number, if one is even obtainable, will also not match the stored value. The ticket reader will recognize this within a second or two and respond, such as by locking the turnstile or alerting security by means of overhead signal lights.

Those of ordinary skill in the art may recognize that many modifications and variations of the present invention may be implemented without departing from the spirit or scope of the invention. Thus, it is intended that the present invention covers the modifications and variations of this invention provided they come within the scope of the appended claims and their equivalents.

What is claimed is:

1. A method for verifying that a ticket is included in a ticket management system, said method comprising:
    producing, in a secure manufacturing facility in accordance with a customer requirement, ticket material (base stock) containing a plurality of randomly distributed passive resonators positioned within each of a plurality of scan tracks, the scan tracks positioned to ensure at least a portion of at least one track will be included with each of a plurality of ticket blanks formed using the base stock;
    printing a non-variable visual element and a variable visible serial number on ones of the plurality of the ticket blanks, suitable for tickets to an event;
    directing an interrogation signal to individual ones of the ticket blanks, operative to cause resonators disposed within the scan track portions included therein to collectively emit a response signal specific to the individual ticket blank;

deriving a random serial number from the response signal, and storing the random serial number in a database in association with the visible serial number printed on the ticket blank;

providing one of the printed ticket blanks with stored random and visible serial numbers as a ticket to a ticket holder in a transaction, and storing transaction data in the database in association with the random and visible serial numbers of the ticket;

presenting the ticket to a ticket interrogation device;

directing, by the interrogation device, a confirmation interrogation signal similar to the previously directed interrogation signal to cause the resonators in the ticket to emit a confirmation signal;

deriving a confirmation serial number from the confirmation signal;

obtaining from the ticket the visual serial number;

comparing the confirmation serial number and the visual serial number to the stored ticket random serial number and the stored visual serial number; and outputting an indication of the ticket being included in the ticket management system as determined by said comparing.

* * * * *